(12) United States Patent
Duncan

(10) Patent No.: US 7,263,621 B2
(45) Date of Patent: Aug. 28, 2007

(54) SYSTEM FOR REDUCING POWER CONSUMPTION IN A MICROPROCESSOR HAVING MULTIPLE INSTRUCTION DECODERS THAT ARE COUPLED TO SELECTORS RECEIVING THEIR OWN OUTPUT AS FEEDBACK

(75) Inventor: Richard Duncan, Bedford, TX (US)

(73) Assignee: VIA Technologies, Inc., Taipei (TW)

( * ) Notice: Subject to any disclaimer, the term of this patent is extended or adjusted under 35 U.S.C. 154(b) by 421 days.

(21) Appl. No.: 10/989,090

(22) Filed: Nov. 15, 2004

(65) Prior Publication Data

US 2006/0107076 A1 May 18, 2006

(51) Int. Cl.
*G06F 1/32* (2006.01)
(52) U.S. Cl. ........................ 713/320; 712/209; 712/210
(58) Field of Classification Search ................ 712/209, 712/210; 713/320
See application file for complete search history.

(56) References Cited

U.S. PATENT DOCUMENTS

| | | | |
|---|---|---|---|
| 6,978,358 B2 * | 12/2005 | Francis | ........................ 712/202 |
| 7,017,030 B2 * | 3/2006 | Oldfield et al. | ............. 712/207 |
| 2004/0199747 A1 * | 10/2004 | Shelor | ........................ 712/209 |
| 2004/0205322 A1 * | 10/2004 | Shelor | ........................ 712/209 |
| 2004/0236926 A1 | 11/2004 | Tran et al. | |

\* cited by examiner

*Primary Examiner*—Chun Cao
*Assistant Examiner*—Albert Wang
(74) *Attorney, Agent, or Firm*—Thomas, Kayden, Horstemeyer & Risley

(57) ABSTRACT

The present disclosure illustrates a system for reducing power consumption in a computer processor. Included is a 16-bit instruction decoder for decoding instructions with 16-bit words, a 32-bit instruction decoder for decoding instructions with 32-bit words, a word length select for indicating a present instruction's word length, and a first selector for routing the instruction into the 16-bit decoder when the present instruction is 16-bits long. The first selector is also configured to route a previous instruction into the 16-bit decoder, maintaining the 16-bit decoder's present state. A second selector is configured to route the instruction into the 32-bit decoder when the present instruction is 32-bits long. The second selector is also configured to route a past instruction into the 32-bit decoder to maintain the 32-bit decoder's present state.

9 Claims, 9 Drawing Sheets

SYSTEM FOR REDUCING POWER CONSUMPTION IN A MICROPROCESSOR HAVING MULTIPLE INSTRUCTION DECODERS THAT ARE COUPLED TO SELECTORS RECEIVING THEIR OWN OUTPUT AS FEEDBACK

TECHNICAL FIELD

The present disclosure is generally related to processors, and more particularly, to a processor with multiple decoding capabilities having a reduced-power operation.

BACKGROUND OF THE DISCLOSURE

Processors (e.g., microprocessors, CPUs, etc.) are used in a wide variety of products and applications, from desktop computers to portable electronic devices, such as cellular phones, laptop computers, and PDAs (personal digital assistants). Some processors are extremely powerful (e.g., processors in high-end computer workstations), while other processors have a simpler design, for lower-end, less expensive applications and products.

There is a general dichotomy between performance and power. Generally speaking, high-performance processors having faster operation and/or more complex designs tend to consume more power than their lower-performance counterparts. Higher power consumption generally leads to higher operating temperatures and shorter battery life (for devices that operate from battery power). The ever-increasing demand and use of portable electronic devices is driving a demand to produce processors that realize lower-power operation, while at the same time maintaining satisfactory performance levels.

One method for reducing the power consumption of devices is to provide modes of reduced-power operation (sometimes referred to as "sleep states") when the devices (or certain portions thereof) are not in use. However, there is also a desire to reduce the power consumption of devices even during active operation. This is often accomplished by providing more efficient designs to the operational components of the devices.

There are a number of power-consuming components in various electronic devices, and the processor is one of them. Even within a processor, there are a number of functional sections, and decoder logic is one such area. The decoder logic of a processor decodes an encoded instruction into a number electrical signals for controlling and carrying out the function of the instruction within execution logic provided in the processor. FIG. 1 is a block diagram illustrating a processor design, which includes a decode stage.

Processor circuitry, however, has certain drawbacks. More specifically, when the word length in an instruction changes from one length to another, excessive power is dissipated due to the parallel structure of multiple instruction decoders. For each length word and computer language the processor is configured to handle, the processor utilizes a separate decoder. When the instruction is loaded into decode stage, each instruction decoder attempts to decode the instruction. With each instruction decoder trying to decode the same instruction, excessive power is dissipated and battery life is shortened.

Accordingly, there is a heretofore unaddressed need to overcome the deficiencies and shortcomings described above.

SUMMARY

Included herein systems and methods for reducing power consumption within a computer processor. The systems may include a first instruction decoder configured to decode instructions with 16-bit words and a second instruction decoder configured to decode instructions with 32-bit words. Also included is a word length select configured to indicate a present instruction's word length and a first selector coupled to the first and second instruction decoders. The decoders may be configured to route the instruction into the 16-bit decoder when the present instruction is 16-bits long. The systems may also include a second selector coupled to the first and second instruction decoders and configured to route the instruction into the 32-bit decoder when the present instruction is 32-bits long. A third selector may be coupled to the first and second instruction decoders and configured to route the present instruction to execute stage of the processor from one of: the 16-bit decoder and the 32-bit decoder.

The methods may include loading a present instruction into decode stage of a computer processor, the instruction having a word length corresponding to at least one decoding device, determining the word length of the present instruction, decoding the present instruction with the decoding device corresponding to the word length of the present instruction, and maintaining the present state of the at least one decoding device not having the corresponding word length.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
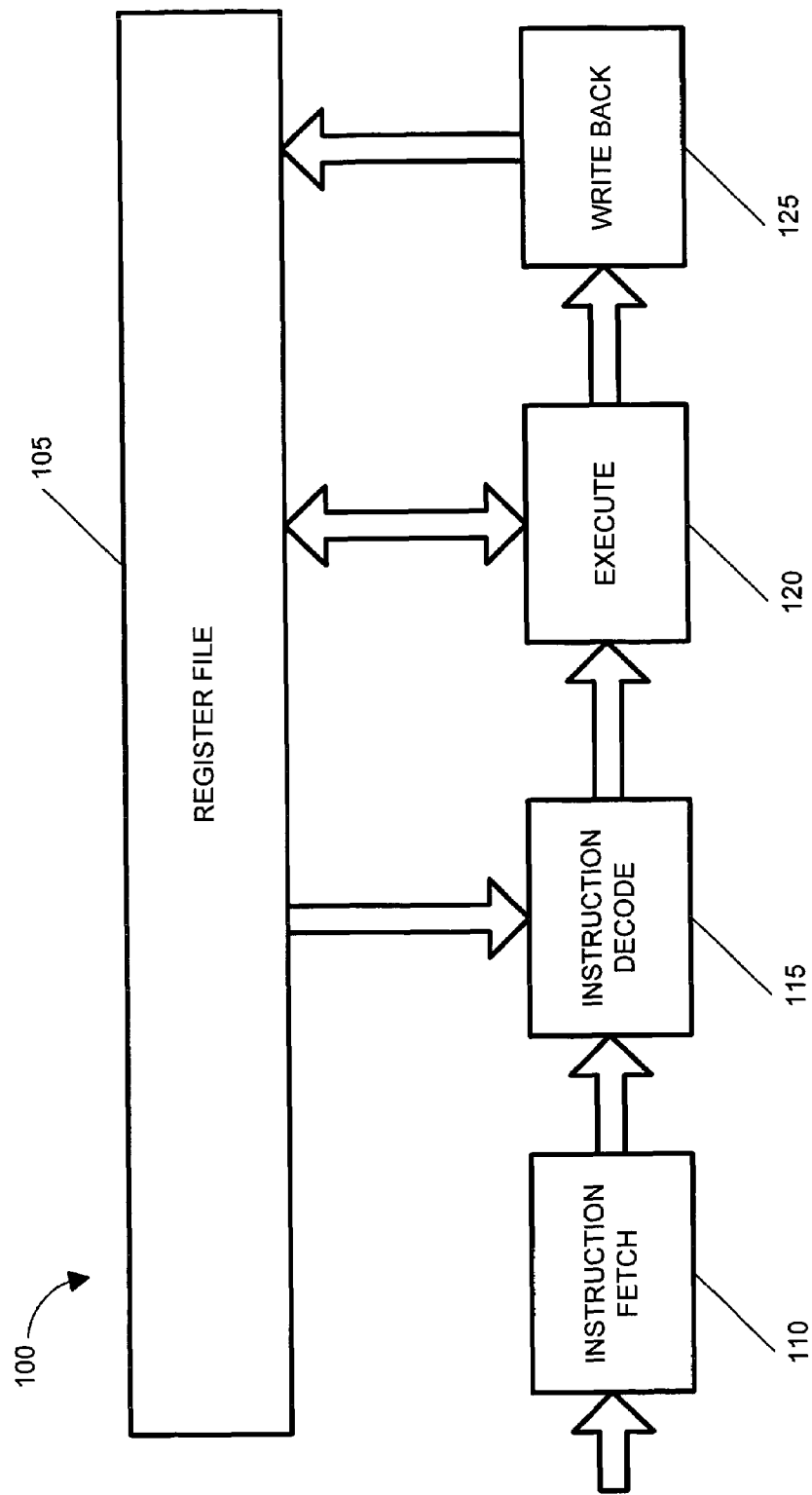
FIG. 1 is a functional block diagram of a microprocessor.

The present disclosure is generally directed to a processor having improved decode logic. In accordance with one embodiment, the processor includes first decoder logic capable of decoding a plurality of encoded instructions comprising an instruction set. The instruction set in the first decoder logic is written in 16-bit words. The first decoder logic has an input to receive an encoded instruction output from the fetch logic. The processor also includes second decoder logic capable decoding a plurality of encoded instructions comprising an instruction set, wherein the instruction set is written in 32-bit words. In operation, the decoder control logic operates such that depending on the word length, the desired instruction decoder logic is selected, and the unnecessary instruction decoder logic is held stable. By holding the unnecessary instruction decoder logic stable power is saved because the logic gates within the unused circuitry remain stable.

Other systems, methods, features, and/or advantages will be or may become apparent to one with skill in the art upon examination of the following drawings and detailed description. It is intended that all such additional systems, methods, features and/or advantages be included within this description and be protected by the accompanying claims.

Having summarized various aspects of the present disclosure, reference will now be made in detail to the description as illustrated in the drawings. While the disclosure will be described in connection with these drawings, there is no intent to limit it to the embodiment or embodiments disclosed therein. On the contrary, the intent is to cover all alternatives, modifications, and equivalents included within the spirit and scope of this disclosure as defined by the appended claims. It should be emphasized that many variations and modifications may be made to the above-described embodiments. All such modifications and variations are intended to be included herein within the scope of this disclosure and protected by the claims following this disclosure.

The fetch-execute cycle of a microprocessor includes a sequence of actions that a central processing unit (CPU) performs to execute each machine code instruction in a program. At the beginning of each cycle, the CPU presents the value of the program counter on the address bus (not shown). The CPU then fetches the instruction from main memory (possibly via a cache and/or a pipeline) via the data bus into the instruction register.

FIG. 1 represents a functional block diagram 100 of one embodiment of a pipeline configuration within a CPU. In this non-limiting exemplary representation, the CPU performs 4 stages. In the first stage the CPU fetches an instruction from another part of the computer, as illustrated in stage 110 and described above.

After instruction fetch stage 110 is implemented, the processor decodes the present instruction to determine how to execute it. Decoding the present instruction can tell the processor whether the instruction calls for an Arithmetic and Logic Unit (ALU) function (such as add, subtract, etc.); whether it will perform an addressing function; or other type of function.

Decode stage 115, also determines which registers are needed to execute the instruction and accesses the registers from register file 105. Once the registers are recognized, decode stage 110 will also fetch the data from the appropriate register (or RAM, cache, etc.) for use by the execute stage 120.

Once the instruction is decoded, and the registers are accessed, execute stage 120 executes the present instruction. This means that execute stage 120 calculates the results of the present instruction. These results include the addresses of loads and stores, as well as values computed by the ALU. As a non-limiting example, if the instruction specifies addition, execute stage 120 will perform addition on the two operands stated.

Once the instruction is executed, the processor may then write back the new data into the appropriate register(s) located in register file 105 via write back stage 125. With an addition function, the ALU will generally be given two operands located in two different registers. The ALU will perform the add function. Write back stage 125 will then put the result into a register designated by the instruction. The CPU increments the program counter to address the next instruction and the cycle is repeated. This operation stops when the processor is instructed to break the cycle.

Figure 2:
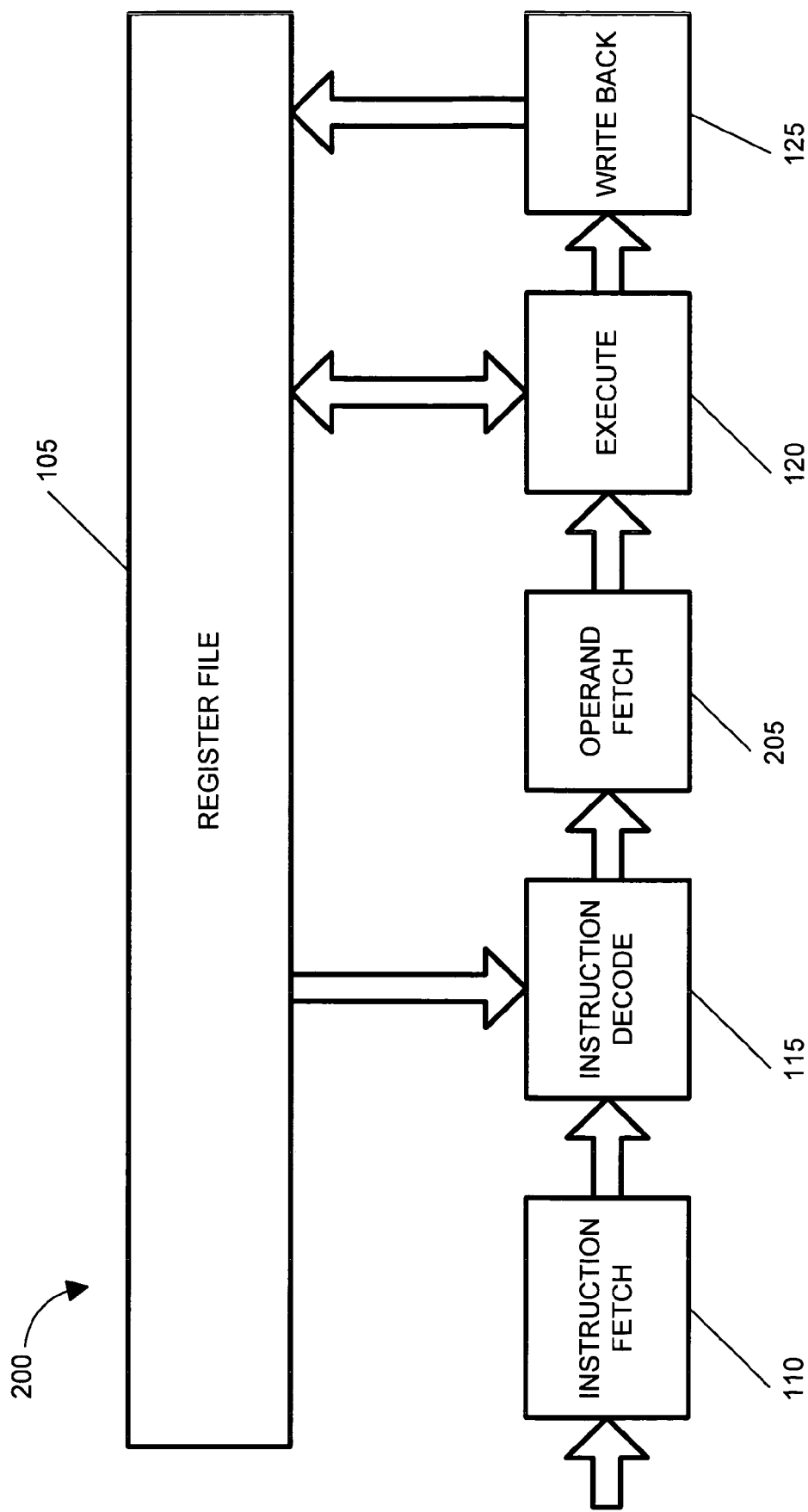
FIG. 2 is a functional block diagram of an alternate embodiment of the microprocessor of FIG. 1.

FIG. 2 illustrates block diagram 200, which is a variation from the block diagram 100 of FIG. 1. Similar to block diagram 100, the CPU first fetches an instruction from memory, cache, etc. Once the instruction is fetched, the processor decodes the instruction, as shown in stage 115. However, as shown in block 205, the processor's next stage is to fetch an operand. After the instruction is decoded in block 115, and the operands are fetched in block 205, the processor executes the instruction according to block 120, and writes the result back into the register file 105 as shown in block 125.

As is evident to one of ordinary skill in the art, block diagrams 100 and 200, illustrated in FIGS. 1 and 2, respectively, are representations of the various stages a microprocessor executes in operation. The descriptions are not intended to limit the present disclosure, as various processes within a computer may be added or subtracted from the representations discussed herein. Further, as shown in the variation from FIG. 1 to FIG. 2, similar stages may be represented in a plurality of ways. For example, as is obvious to one of ordinary skill in the art, the processes discussed in FIGS. 1 and 2 may be represented with any of a plurality of different stages. This disclosure is not constrained to the 5 stages represented in FIG. 1, or the 6 stages in FIG. 2. As one of ordinary skill in the art would know, any number of stages and processes may be implemented.

Figure 3:
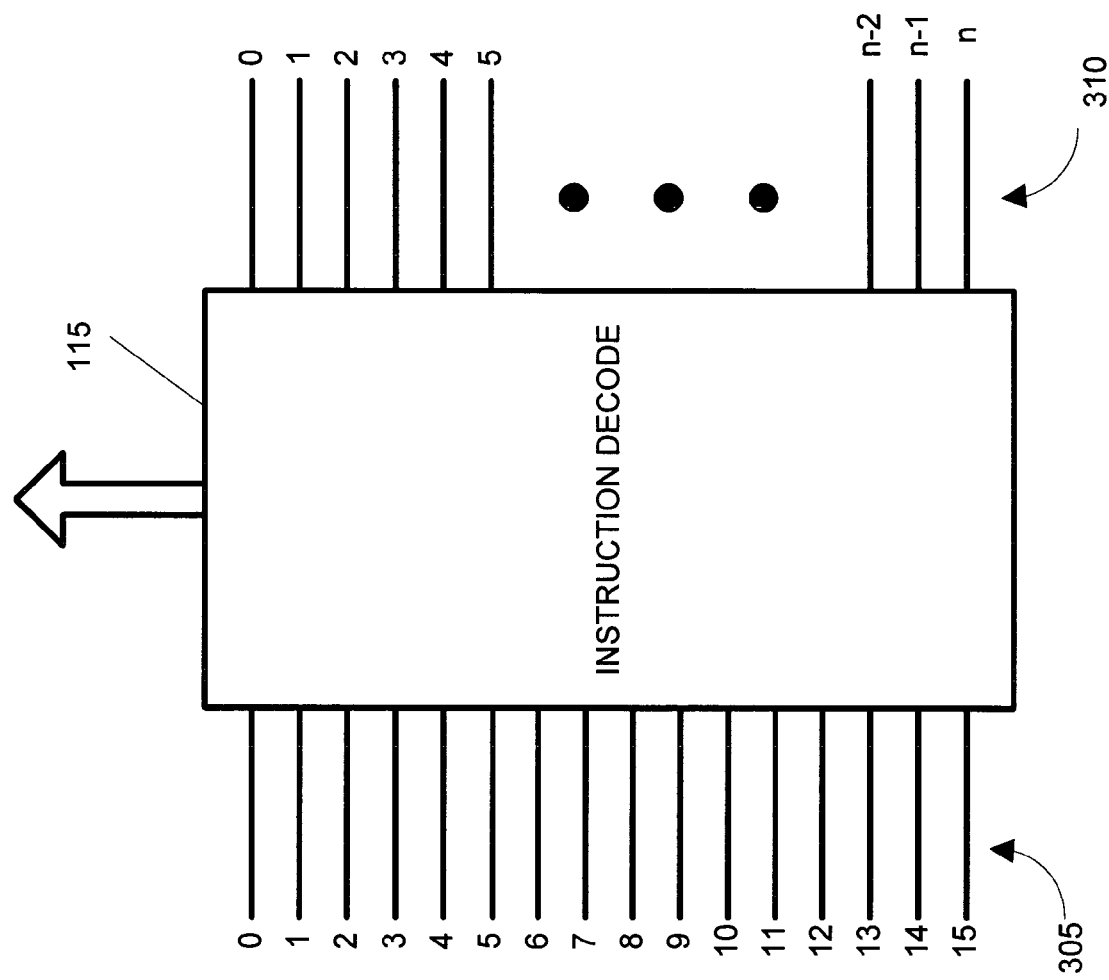
FIG. 3 is a functional block diagram of a decoder located within decode stage of the microprocessor of FIGS. 1 and 2.

FIG. 3 represents a nonlimiting example of decoder stage 115 from FIGS. 1 and 2. As shown in FIG. 3, 16 inputs 305 are provided to the decoder 115, which has n outputs 310. The outputs are signals that indicate the registers to be accessed, along with other data utilized by the CPU. In this regard, the outputs 310 from the decoder 115 are signal lines that are used as inputs and/or control signals for other circuit components within an execution unit (not shown) of the processor, and the execution unit carries out the functional operations specified by the encoded instructions.

Figure 4:
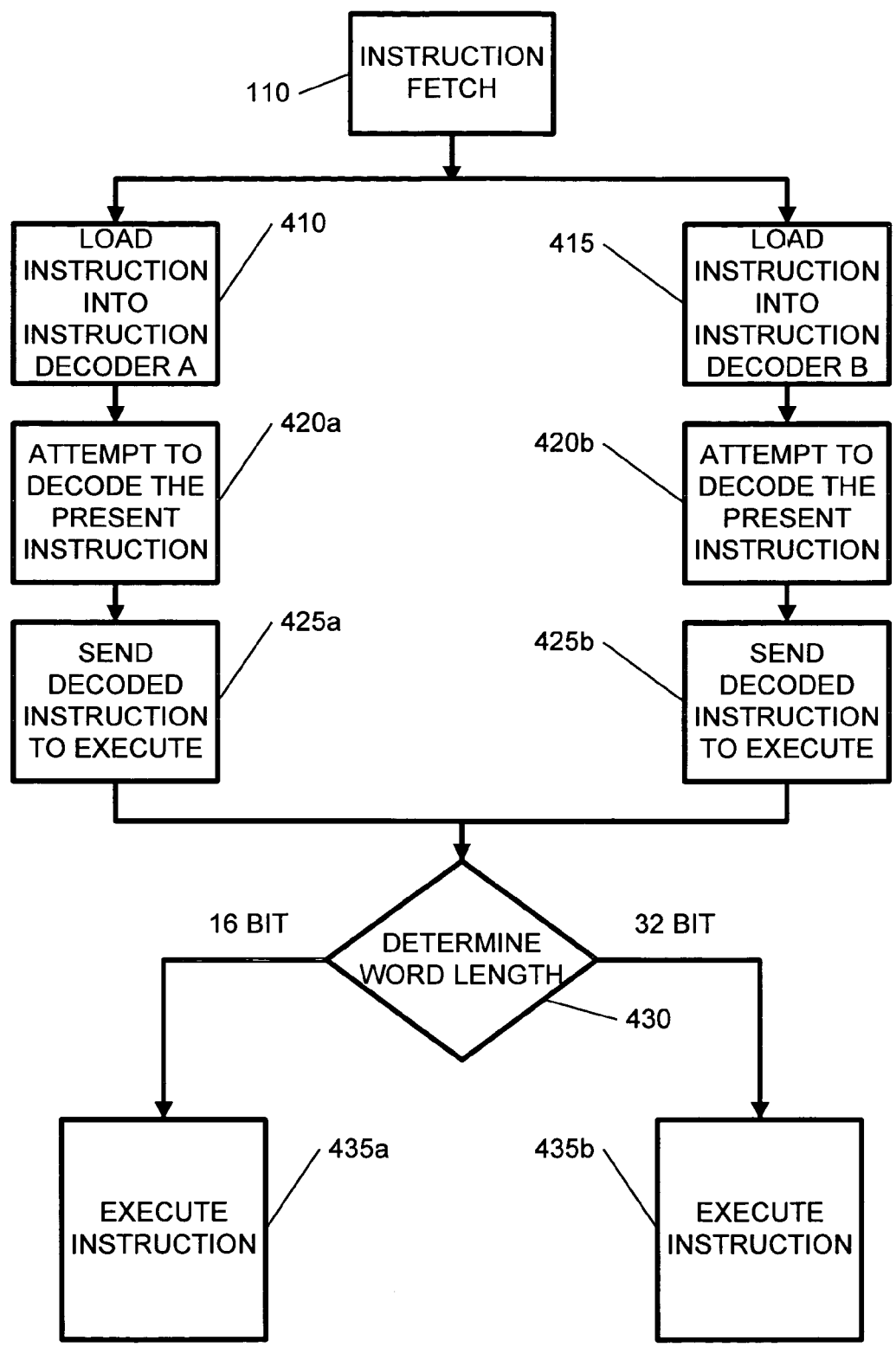
FIG. 4 is flowchart of diagram of an alternate embodiment of the microprocessor of FIGS. 1 and 2 illustrating parallel circuitry.

FIG. 4 illustrates a flowchart demonstrating logical steps that may be performed in a prior art CPU. As stated above, fetch instruction 110 will retrieve the present instruction. Decode stage will then load the instruction into both instruction decoder A (410) and instruction decoder logic B (415). Simultaneously, both instruction decoder A and instruction decoder B will attempt to decode the instruction, as shown in stages 420a and 420b, respectively. After the instruction is decoded in both decoders 410, 415, both sets of data are sent to execute stage 120, as shown in stages 425a and 425b. Execute stage 120 determines the word length, as represented by decision stage 430, and if necessary, flushes the pipeline (not shown). The instruction is then executed in stage 435a if the word length is 16 bits and in stage 435 if 32 bits.

As stated above, this implementation consumes excess power because the present instruction is decoded (according to this example) in both the 16-bit decoder and the 32-bit decoder. This inefficiency reduces battery life of the device. This disclosure illustrates an implementation designed to reduce the unnecessary power dissipation.

Figure 5:
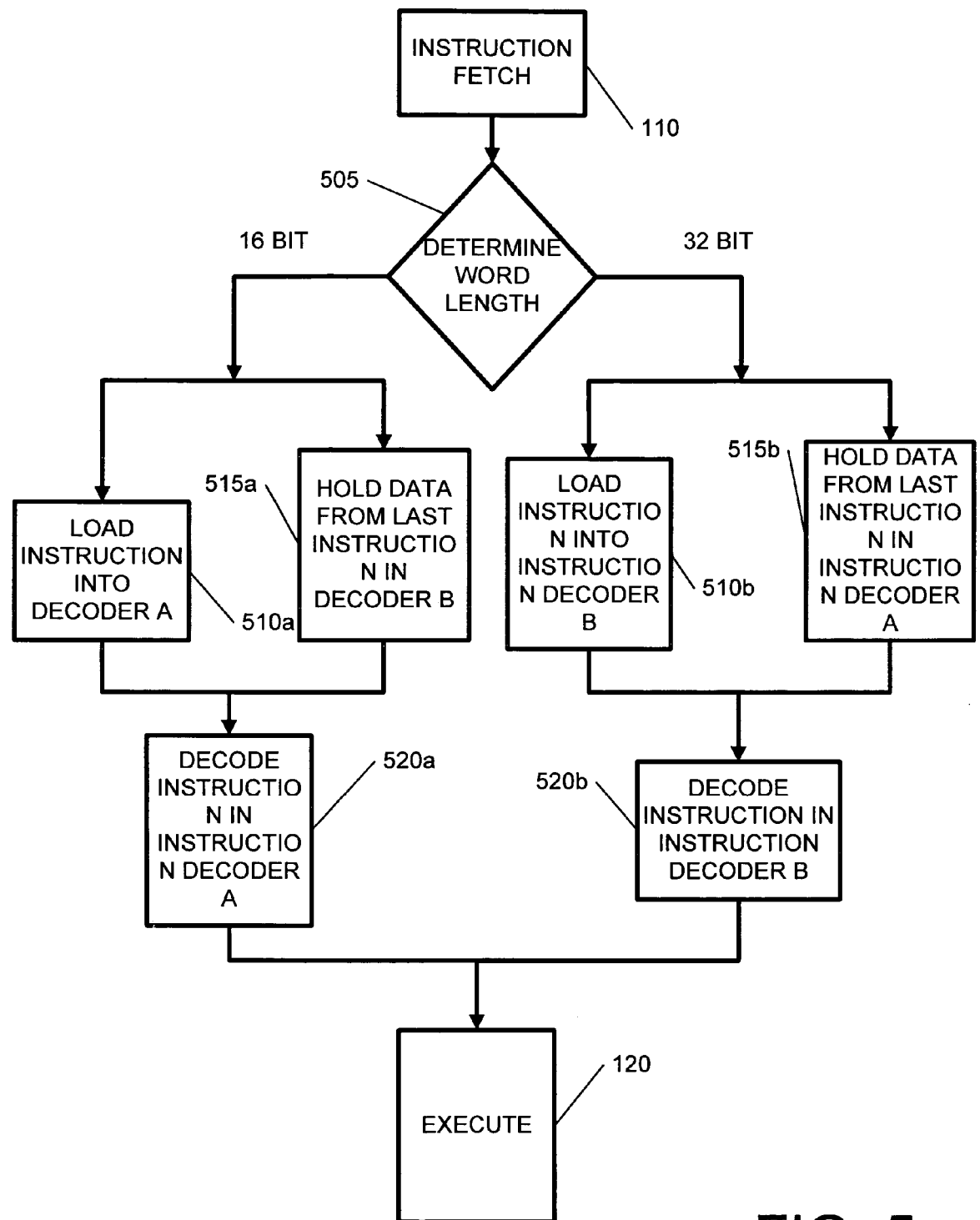
FIG. 5 is a flowchart diagram illustrating executable stages for the microprocessor of FIGS. 1 and 2.

FIG. 5 illustrates a flowchart demonstrating logical steps of one embodiment of the microprocessor of FIG. 1. Again, the CPU will first fetch the present instruction, as shown in stage 110. Then, decode stage (115 of FIG. 1) will determine the word length of the instruction, as in stage 505. As is obvious to one of ordinary skill in the art, the processor of this disclosure is not necessarily constrained to a 16-bit word or a 32-bit word. To the contrary, the present disclosure teaches that instructions of varying word lengths and computer languages can be decoded, while still realizing the intended benefits. FIG. 5, merely illustrates one embodiment, and is not intended to limit the present disclosure.

After instruction fetch 110 has retrieved the present instruction, decode stage 115 performs a check. If decode stage 115 determines that the word length is 16-bits, decode stage 115 will load the instruction into the 16-bit decoder 510a and hold stable the other decoders (here the 32-bit decoder), as illustrated in 515a. The 16-bit decoder will then decode the instruction, as shown in stage 520a, and send the decoded instruction to execute stage 120 for execution.

In the alternative, if decode stage 115 determines that the word length is 32-bits, it will load the instruction into the 32-bit decoder 510b, and hold stable the other decoders, as shown in stage 515b. Decode stage 115 will then decode the instruction in the 32-bit decoder 520b, and execute stage 120 will execute the instruction.

This configuration of FIG. 5 illustrates that one decoder is implemented at a particular time. This configuration reduces the activity within the processor, and as a result, reduces power use. The reduction in power use consequently prolongs battery life.

Figure 6:
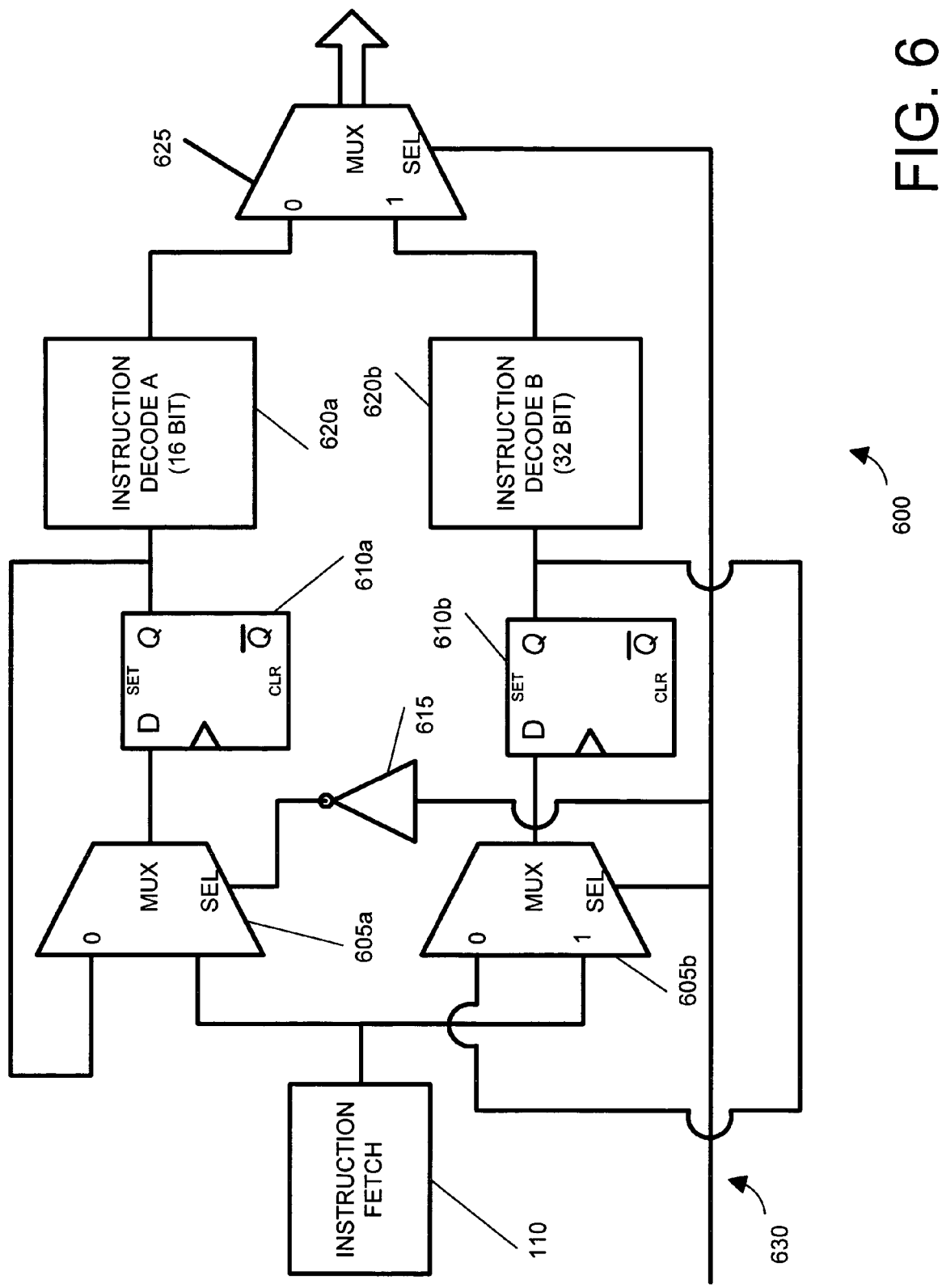
FIG. 6 is a functional block diagram of power reducing logic for the microprocessor of FIGS. 1 and 2.

FIG. 6 illustrates one embodiment of a power saving decode circuit 600. This particular circuit 600 saves power by holding stable the decoders that do not correspond to the present instruction. As a non-limiting example, instruction fetch 110 communicates the present instruction to both multiplexors 605a and 605b, which are coupled to flip-flop modules 610a and 610b. The select inputs of multiplexors 605a and 605b are coupled to indication line 630. However, inverter 615 is positioned in series with the select input of multiplexor 605a and line 630 such that when multiplexor 605a is selected, 605b will be de-selected, and vice-versa. As is obvious to one of ordinary skill in the art, inverter 615 could be placed in series with multiplexor 605b.

The outputs of multiplexors 605a and 605b are electrically coupled to flip-flops 610a and 610b, respectively. Flip-flops 610a and 610b hold the input data for a clock cycle and send the data onto instruction decode A (16 Bit) 620a and instruction decode B (32 Bit) 620b. The two decoders are electrically coupled to multiplexor 625. The select input of multiplexor 625 is electrically coupled to indicator line 630. Depending on current operation of this circuit 600, multiplexor 625 outputs the decoded present instruction from either instruction decode A (620a) or instruction decode B (620b) to execute stage 120 (from FIGS. 1, 2).

In operation, instruction fetch stage 110 communicates a present instruction into multiplexors 605a and 605b. If indicator line 630 indicates that the present instruction is a 16-bit instruction, it will output a logical "0", which will be communicated into the select inputs of multiplexors 605a and 605b. With respect to multiplexor 605a, the logical "0" will be inverted and communicated into the select input of multiplexor 605a. The present instruction from fetch 110, which is input to multiplexor 605a, will then be output into flip-flop 610a. Flip-flop 610a holds the signal, and inputs it into instruction decode A (16-bit) 620a, which is configured to decode instructions composed of 16-bit words. Once the present instruction is decoded, it is input into multiplexor 625. Since the select input of multiplexor 625 is coupled to indicator line 630, indicator line 630 will communicate a signal to multiplexor 625 indicating that the present instruction is composed of 16-bit words. Multiplexor 625 will then output the decoded present instruction from instruction decode A (16 bit), as shown in stage 620a. This signal is forwarded to execute stage 120, as described above.

In continuing this non-limiting example, a logical "0" is input into the select input of multiplexor 605b, which is electrically coupled to the output of flip-flop 610b. The effect of this configuration is that a previous instruction, as stored in flip-flop 610b, is communicated to multiplexor 605b, which is then communicated to flip-flop 610b. When flip-flop 610b outputs its signal into instruction decode B (32 bit) 620b, the electrical state within instruction decode B 620b remains stable, because the circuitry in this decoder 620b remains the same as in the last instruction. By maintaining state, power usage in this decoder 620b is reduced.

If on the other hand, indicator line 630 outputs a logical "1," then the present instruction is written in 32-bit words. The present instruction is then sent to instruction decode B (32 bit) 620b, which decodes the present instruction followed by multiplexor forwarding the decoded present instruction onto execute stage 120. As with the 16-bit example above, flip-flop module 610a communicates a past instruction into instruction decode A (16 bit) 620a, which allows this decoder (620a) to remain stable. The power savings are realized by the circuitry remaining stable.

As is also evident to one of ordinary skill in the art, circuit 600 depicted in FIG. 6 is merely a representation of a circuit with the above mentioned capabilities. The elements in a typical CPU will have numerous signal lines, and multiple components may be included to implement the above-mentioned functions, depending on system parameters. As a non-limiting example, if a computer is operating with a 32 bit word, the signal lines will be configured to communicate those signals. Further, one of ordinary skill in the art would know that the elements discussed in reference to this figure, such as multiplexors and flip-flops, may be substituted with any circuitry capable of achieving the above mentioned functions. The foregoing description is not intended to be exhaustive or to limit the invention to the precise forms disclosed. Obvious modifications or variations are possible in light of the above teachings.

Figure 7:
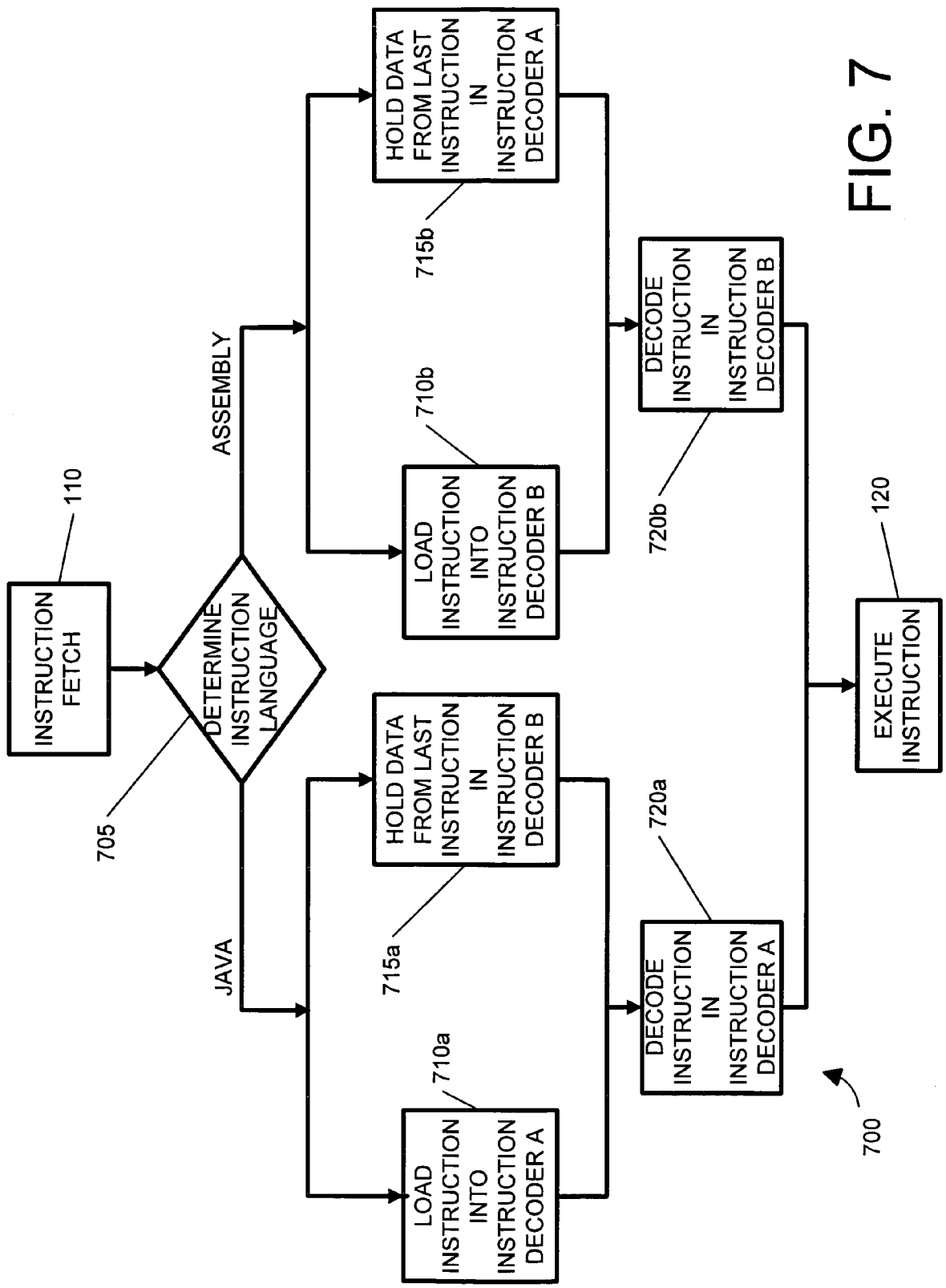
FIG. 7 is a flowchart diagram of an alternate embodiment to the stages of FIG. 5.

FIG. 7 is a diagram of flowchart 700 that depicts an alternate embodiment to the steps illustrated in FIG. 5. However, after instruction fetch 110 in FIG. 7 loads the present instruction into decode stage 115, decode stage 115 may be configured to determine the computer language in which the present instruction is coded. If the present instruction is coded in JAVA®, as a nonlimiting example, the present instruction will be loaded into the JAVA® decoder 710a, while the other decoder will be kept stable by holding the data from the last instruction 715a. The instruction is then decoded by the JAVA® decoder 720A, and sent to execute 120.

Alternatively, if the present instruction is coded in assembly language, as an additional nonlimiting example, the instruction is loaded into assembly decoder 710b, while the JAVA® decoder is stabilized 715b. The instruction is then decoded in assembly decoder 720b. The decoded present instruction is then sent on to execute stage 120.

Figure 8:
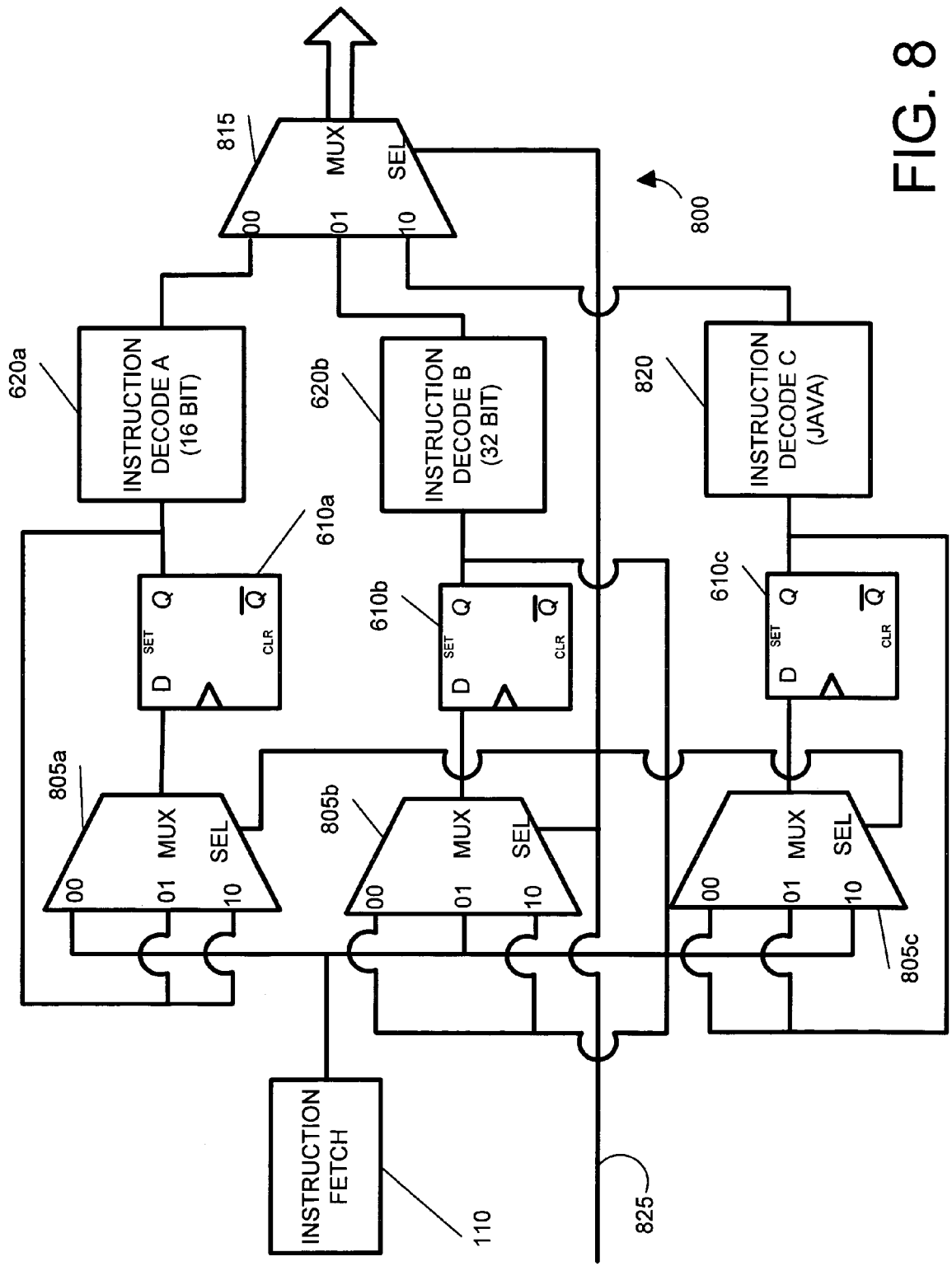
FIG. 8 is a functional block diagram of power reducing logic of the present disclosure positioned within decode stage of either FIG. 1 or 2.

FIG. 8 is a circuit 800 similar to the circuit of FIG. 6, with the addition of another decoder. By combining the circuitry of FIG. 6 with the logic of FIG. 7, this circuit 800 has the ability to decode instructions of a plurality of word lengths, while also maintaining the capability to decode JAVA® instructions. As one of ordinary skill in the art would realize, the power benefits realized in the embodiment of FIG. 6 are increased with three decoders. When any one decoder is active, two decoders are now held stable, thereby increasing power efficiency.

As illustrated in FIG. 8, instruction fetch 110 loads the present instruction into multiplexors 805a, 805b, and 805c. While these devices are illustrated with three inputs, this is merely a functional block diagram. As is known by one of ordinary skill in the art multiplexors 805a, 805b, and 805c may take many forms to achieve the desired results. As a non-limiting example, 805a, 805b, and 805c may be 4×1 multiplexors, configured to accommodate this particular circuit design, as shown in FIG. 8. Further, any other appropriate circuit element or configuration may also be used.

Indicator line 825 is configured to signal whether the present instruction is written in 16-bits, 32-bits, or in JAVA®. Indicator line 825 is a two bit line in this example, and will take the form of logical "00," "01," or "10." This signal is input into the select input of multiplexors 805a, 805b, and 805c to determine which decoder will be active. One should note that in this nonlimiting example, no inverter is used to modify the line indicator signal. While the circuit 600 implements an inverter to achieve the desired results, one is not utilized in this configuration.

Once multiplexors 805a, 805b, and 805c determine the appropriate decoder, the present instruction is forwarded through the flip-flop (either 610a, 610b, or 610c), and onto the appropriate decoder. When the instruction is decoded, it is sent to multiplexor 815, which sends the proper decoded instruction to execute stage 120.

For example, if the present instruction is coded in JAVA®, instruction fetch 110 will communicate the present instruction to multiplexor 805c. Indicator line 825 will communicate a logical "10" signal to the multiplexors, which will allow the present instruction to pass through multiplexor 805c, and onto flip-flop 610c. Instruction decoder C (JAVA) 820 will then decode the present instruction and forward to multiplexor 815. Indicator line 825 is coupled to the select input of multiplexor 815, and will allow the decoded present instruction to pass to execution stage 120.

As in the previous embodiments of the present disclosure, instruction decode A (16 bit) 620a and instruction decode B (32 bit) 620b are held stable by feeding a previous instruction into their inputs via flip-flops 610a and 610b, respectively. Because the previous instruction allows instruction decode A (620a) and instruction decode B (620b) to remain in the same state as in the previous instruction, power is saved.

Figure 9:
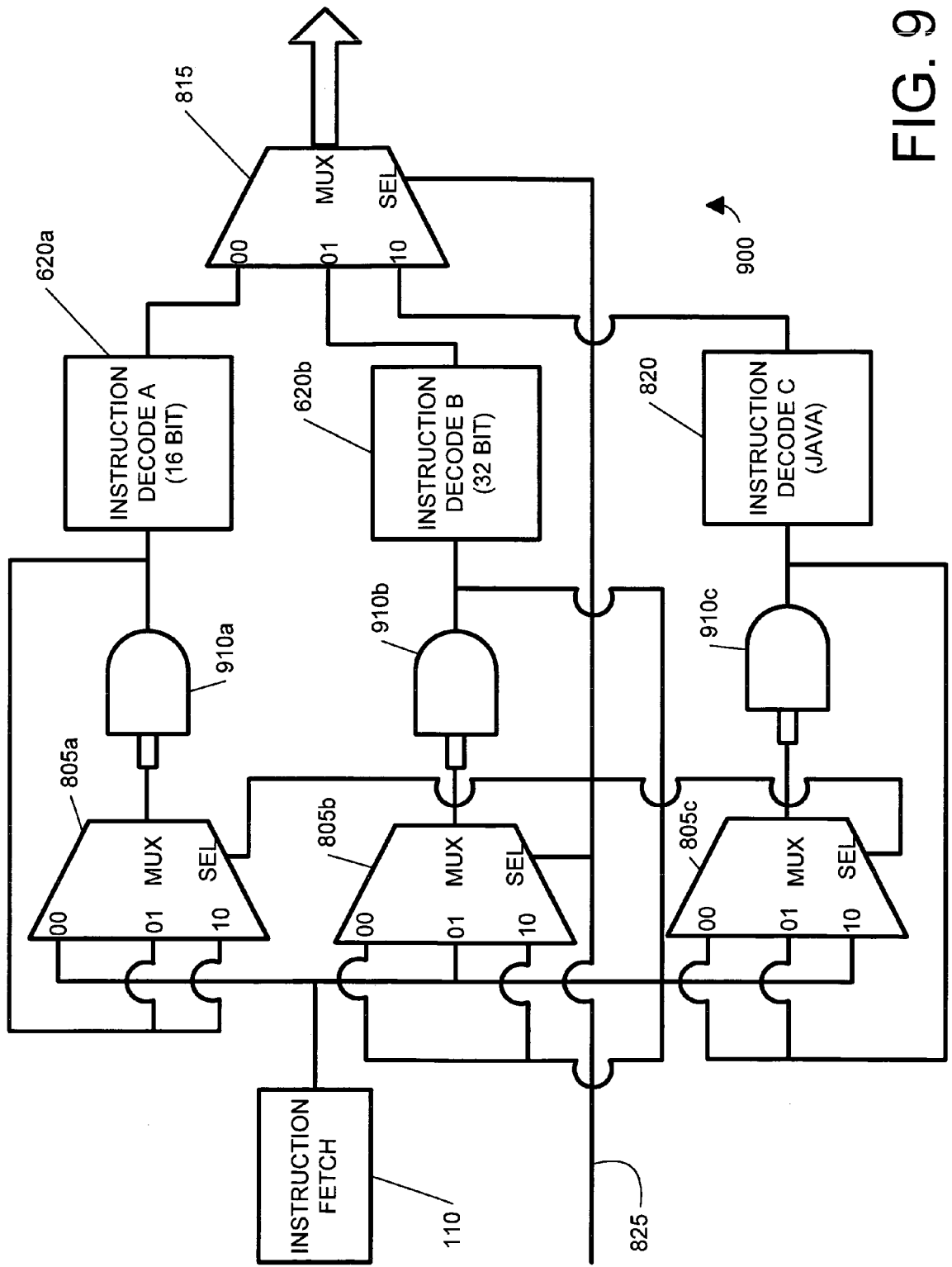
FIG. 9 is a functional block diagram of power reducing logic of the present disclosure positioned within decode stage of either FIG. 1 or 2.

FIG. 9 is a diagram of circuit 900 that is similar to circuit 800 but with new elements 910a, 910b, and 910c. This embodiment merely illustrates that the flip-flops of the previous embodiments may be substituted with other logic elements (here, AND gates are used). As is obvious to one of ordinary skill in the art, any of a plurality of components may be used to achieve the same result, and the representation of FIG. 9 is but a nonlimiting example.

FIG. 9 is also a circuit 900 similar to the circuit of FIG. 6, with the addition of another decoder. By combining the circuitry of FIG. 6 with the logic of FIG. 7, circuit 900 has the ability to decode instructions of a plurality of word lengths, while also maintaining the capability to decode JAVA® instructions. As one of ordinary skill in the art would realize, the power benefits realized in the embodiment of FIG. 6 are increased with three decoders. When any one decoder is active, two decoders are now held stable, thereby increasing power efficiency.

As illustrated in FIG. 9, instruction fetch 110 loads the present instruction into multiplexors 805a, 805b, and 805c. While these devices are illustrated with three inputs, this is merely a functional block diagram. As is known by one of ordinary skill in the art multiplexors 805a, 805b, and 805c may take many forms to achieve the desired results. As a non-limiting example, 805a, 805b, and 805c may be 4×1 multiplexors, configured to accommodate this particular circuit design, as shown in FIG. 9. Further, any other appropriate circuit element or configuration may also be used.

Indicator line 825 is configured to signal whether the present instruction is written in 16-bits, 32-bits, or in JAVA®. Indicator line 825 is a two bit line in this example, and will take the form of logical "00," "01," or "10." This signal is input into the select input of multiplexors 805a, 805b, and 805c to determine which decoder will be active. One should note that in this nonlimiting example, no inverter is used to modify the line indicator signal. While the circuit 600 implements an inverter to achieve the desired results, one is not utilized in this configuration.

Once multiplexors 805a, 805b, and 805c determine the appropriate decoder, the present instruction is forwarded through the AND gate (either 910a, 910b, or 910c), and onto the appropriate decoder. When the instruction is decoded, it is sent to multiplexor 815, which sends the proper decoded instruction to execute stage 120.

For example, if the present instruction is coded in JAVA®, instruction decode 110 will communicate the present instruction to multiplexor 805c. Indicator line 825 will communicate a logical "10" signal to the multiplexors, which will allow the present instruction to pass through multiplexor 805c, and onto AND gate 910c. Instruction decoder C (JAVA) 820 will then decode the present instruction and forward the signal to multiplexor 815. Indicator line 825 is coupled to the select input of multiplexor 815, and will allow the decoded present instruction to pass to execution stage 120.

As in the previous embodiments of the present disclosure, instruction decode A (16 bit) 620a and instruction decode B (32 bit) 620b are held stable by feeding a previous instruction into their inputs via AND gates 910a and 910b, respectively. Because the previous instruction allows instruction decode A (620a) and instruction decode B (620b) to remain in the same state as in the previous instruction, power is saved.

As one of ordinary skill in the art can easily imagine, an alternative embodiment may instead comprise logic configured for disabling any of the plurality of decoding logic within instruction decode stage 115. As a nonlimiting example, with reference to FIG. 9, one can easily imagine circuit 900 configured to accept a 16-bit instruction, and disable instruction decode B (32 bit) 620b and instruction decode C (JAVA) 820 through disabling logic (not shown). This allows the 16-bit instruction to pass to instruction decode A (16 bit) 620a. Instruction decode A (16 bit) 620a will decode the 16-bit instruction and send it to the next stage in the pipeline.

Similarly, circuit 900 disables both instruction decode A (16 bit) 620a and instruction decode B (32 bit) 620b when a JAVA® instruction is communicated to instruction decode stage 115. When a 32-bit instruction is communicated to circuit 900, disabling logic disables both instruction decode A (16 bit) 620a and instruction decode C (JAVA) 820. As is evident to one of ordinary skill in the art, such a configuration realizes the same benefits discussed above through the reduction of active circuitry within instruction decode stage 115.

In this regard, the embodiment or embodiments discussed were chosen and described to provide the best illustration of the principles of the disclosure and its practical application to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly and legally entitled.

The invention claimed is:

1. A circuit for reducing power consumption within a computer processor comprising:
    a first instruction decoder configured to decode instructions with 16-bit words;
    a second instruction decoder configured to decode instructions with 32-bit words;
    a word length select configured to indicate a present instruction's word length;
    a first selector coupled to the first instruction decoder, the first selector configured to receive the instruction, the first selector configured to receive a feedback signal from an output of the first selector, the first selector configured to route the instruction into the first instruction decoder when the present instruction is 16-bits long;
    a second selector coupled to the second instruction decoder, the second selector configured to route the instruction into the second instruction decoder when the present instruction is 32-bits long; and
    a third selector coupled to the first and second instruction decoders and configured to route the present instruction to execute stage of the processor from one of the 16-bit decoder and the 32-bit decoder.

2. The circuit of claim 1, wherein the first selector is further configured to route a past instruction into the 16-bit decoder when the present instruction is not 16-bits long.

3. The circuit of claim 1, wherein the second selector is further configured to route a past instruction into the 32-bit decoder when the present instruction is not 32-bits long.

4. A system for reducing power consumption in a computer processor comprising:
    a plurality of decoding logic, each decoding logic having an instruction parameter capability;
    an indicator line configured to indicate at least one parameter of a present instruction;
    a plurality of primary selectors configured to select the decoding logic with instruction parameter capability that corresponds with the present instruction, at least one of the plurality of primary selectors configured to receive a feedback signal from the output of that respective primary selector; and
    a secondary selector configured to select the present instruction from the decoding logic with the decoding capabilities that correspond to the present instruction.

5. The system of claim 4, wherein at least one of the decoding logic is configured to decode JAVA.

6. The system of claim 4, wherein at least one of the decoding logic is configured to decode 16-bit instructions.

7. The system of claim 4, wherein at least one of the decoding logic is configured to decode 32-bit instructions.

8. The system of claim 4, wherein the indicator line indicates the computer language of the present instruction.

9. The system of claim 4, wherein the indicator line indicates the word length of the present instruction.

* * * * *